US012597342B2

(12) United States Patent (10) Patent No.: US 12,597,342 B2
Horton et al. (45) Date of Patent: Apr. 7, 2026

(54) METHOD AND DEVICE FOR CONTROLLING IN-VEHICLE SIGNAGE

(71) Applicant: MODAS TECHNOLOGY LIMITED, Hemel Hempstead (GB)

(72) Inventors: Damian Andrew Horton, Amersham (GB); Marcus Simon Edward Robbins, Leighton Buzzard (GB); Anna Rachel Corp, London (GB)

(73) Assignee: MODAS TECHNOLOGY LIMITED, Hemel Hempstead (GB)

( * ) Notice: Subject to any disclaimer, the term of this patent is extended or adjusted under 35 U.S.C. 154(b) by 74 days.

(21) Appl. No.: 18/580,400

(22) PCT Filed: Aug. 4, 2022

(86) PCT No.: PCT/GB2022/000070
§ 371 (c)(1),
(2) Date: Jan. 18, 2024

(87) PCT Pub. No.: WO2023/017233
PCT Pub. Date: Feb. 16, 2023

(65) Prior Publication Data
US 2024/0339032 A1 Oct. 10, 2024

(30) Foreign Application Priority Data
Aug. 9, 2021 (GB) ...................................... 2111436

(51) Int. Cl.
*G08G 1/09* (2006.01)
*G01C 21/36* (2006.01)
(Continued)

(52) U.S. Cl.
CPC ......... *G08G 1/093* (2013.01); *G01C 21/3655* (2013.01); *G01C 21/3697* (2013.01);
(Continued)

(58) Field of Classification Search
None
See application file for complete search history.

(56) References Cited

U.S. PATENT DOCUMENTS 5,925,090 A 7/1999 Poonsaengsathit
7,558,635 B1 7/2009 Theil et al.
(Continued)

OTHER PUBLICATIONS

International Search Report (Form PCT/ISA/210) for International Patent Application No. PCT/GB2022/000070 mailed Nov. 23, 2022, 4 pages.
(Continued)

*Primary Examiner* — Steven Lim
(74) *Attorney, Agent, or Firm* — Withrow + Terranova, PLLC; Vincent K. Gustafson

(57) ABSTRACT

A device for controlling in-vehicle signage is disposed to provide a physical indication of a particular in-vehicle sign. The data defining the particular sign is associated with data defining a trigger point for causing the occurrence of the indication of the particular sign. The device is adapted for control by a processor that is responsive to a conflict between the particular sign and at least one of another sign or a message and is disposed to alter the data defining the trigger point to remove the conflict. The trigger point is defined by the intersection of the path of a vehicle and a trigger zone extending spatially from a defined location of the particular sign.

10 Claims, 6 Drawing Sheets

(51) Int. Cl.

| | |
|---|---|
| *G08G 1/0962* | (2006.01) |
| *G08G 1/0967* | (2006.01) |
| *G08G 1/0968* | (2006.01) |

(52) U.S. Cl.
CPC ... *G08G 1/09626* (2013.01); *G08G 1/096716* (2013.01); *G08G 1/09675* (2013.01); *G08G 1/096872* (2013.01)

(56) References Cited

U.S. PATENT DOCUMENTS

| | | | |
|---|---|---|---|
| 12,090,997 B1* | 9/2024 | Ferguson | B60W 30/0953 |
| 2003/0120420 A1* | 6/2003 | D'Amico | G08G 1/096844 701/400 |
| 2008/0243326 A1* | 10/2008 | Dobler | B60K 35/00 701/31.4 |
| 2010/0207787 A1 | 8/2010 | Catten et al. | |
| 2014/0191882 A1* | 7/2014 | Varma | G08G 1/0104 340/905 |
| 2016/0119897 A1 | 4/2016 | Kim et al. | |
| 2018/0132281 A1* | 5/2018 | Zhao | H04W 4/06 |
| 2018/0180435 A1 | 6/2018 | Schneider | |
| 2020/0166369 A1 | 5/2020 | Iijima et al. | |
| 2020/0168080 A1* | 5/2020 | Kim | G08G 1/164 |
| 2021/0024061 A1* | 1/2021 | Visintainer | B60W 30/0956 |
| 2021/0306277 A1* | 9/2021 | Yamashiro | H04W 4/40 |

OTHER PUBLICATIONS

Written Opinion (Form PCT/ISA/237) for International Patent Application No. PCT/GB2022/000070 mailed Nov. 23, 2022, 8 pages.

Search Report under Section 17(4) for United Kingdom Patent Application No. 2210124.0 dated Jan. 9, 2023, 2 pages.

"Human Factors (HF), Intelligent Transport Systems (ITS); ICT in Cars; Draft ETSI TR 102 762," European Telecommunications Standards Institute (ETSI), 650, Route Des Lucioles, F-06921 Sophia-Antipolis, France, vol. HF, No. V.0.0.21, Oct. 2, 2009, pp. 1-76.

Office Action for European Patent Application No. 22768448.7 mailed Jun. 17, 2025, 7 pages.

* cited by examiner

METHOD AND DEVICE FOR CONTROLLING IN-VEHICLE SIGNAGE

This application is a 35 U.S.C. § 371 national phase filing of International Application No. PCT/GB2022/000070 filed on Aug. 4, 2022, and claims the benefit of United Kingdom Patent Application No. 2111436.8 filed on Aug. 9, 2021, wherein the entire contents of the foregoing applications are hereby incorporated by reference herein.

BACKGROUND TO THE INVENTION

This invention relates to a method and device for the provision of in-vehicle signs, that is to say signs which are defined in data generated externally and communicated to a device in or on a vehicle (usually road vehicle) for display. The term 'in-vehicle sign' includes conventional road signs but also commercial or convenience signage. The term 'road vehicle' includes vehicles capable of use on public or private roads or car parks or use 'off-road'.

Road authorities have historically used physical road signs to provide information to drivers. However, with greater levels of technology and digital communications, governments and authorities of all kinds are looking for newer technological ways to provide information to drivers.

Variable messages signs (VMS) have been installed on motorways and major roads for some time with controllers being able to vary the message displayed to road users. These have become more sophisticated over time, especially with the development of 'smart motorways'. However, the installations are expensive and are therefore not affordable everywhere and so reliance is placed on physical signs, including temporary physical signs for diversions or hazard which take significant time to deploy and are not always put in place. Given the increasing presence of technology in vehicles such as infotainment and navigation systems, road management authorities and other organizations are looking to create digital communications that are presented directly to the vehicle occupants with what is referred to as in-vehicle signage (IVS).

The objective of IVS is to send messages to in vehicle mobile applications which may be carried by the vehicle or occupant thereof, or to the vehicle's software system and for those applications to then relay a message to the vehicle's occupants. This may be via a visual or audio interface, potentially using the vehicle's head unit and then displayed on an infotainment screen and/or relayed to the sound system. In-vehicle messages may also be sent via non-vehicle hardware, such as mobile phones and other electronic devices.

Road management authorities will want to send IVS with road alerts that may inform a vehicle's occupant of a road hazard or important road information. They may want to send this to distinct vehicle occupant groups and may create multiple messages in multiple languages based upon inputs provided by vehicle occupants. There may also be several different IVS providers for a given time or location. For example, IVS may potentially be produced simultaneously by the Department for Transport, Highways England and other national, regional and local authorities, Transport for London, HGV lorry alerts, sports stadiums or other major events.

Private enterprises may eventually provide their own in-vehicle messages that may be delivered to vehicle occupants which may range from real time availability of parking or vehicle charging points to tour guides or advertisements. Within this specification these are included within the term 'in-vehicle road sign'.

The term 'road' extends to public and private roads, car parks and temporary locations Overall, there is a potential for there to be many messages for simultaneous or near-simultaneous delivery and therefore systems of message management are needed. If several messages are received close together present vehicle systems might potentially deal with them in various ways, none of which are satisfactory. Some vehicle announcement systems can relay several messages simultaneously, so the messages might speak over one another, others may have more than one audio channel so again over-speaking could happen; in both cases messages become indecipherable. Other systems might latch on to the first to message to arrive and start to speak that message but interrupt to start the next message, thus cutting off the first. Another system may queue the information and consequentially queued messages might be received too late for the user.

An alternative would be priority and suppression, similar to when an infotainment system is playing music or radio, which is suppressed for the delivery of navigation messages. Another priority/suppression example in navigation systems is display of an enlarged junction map and turning information that overrides display of a wider scale map that may have other information such as traffic queues. The disadvantage of message suppression is that information is lost and while it may be acceptable to lose music or advertisements, one or more IVS signs may contain important information and navigation information is also important when that is also being used, so that should not be suppressed either.

Given that a driver of the vehicle has limited capacity for absorbing and acting upon messaging, the problem is not really solved by having, for example, multiple screens, and as explained multiple audio channels become indecipherable.

The present invention is directed towards managing conflicts between IVS messaging and/or between IVS and other messaging such as navigational messaging, so as to avoid problems such as 'over-speaking' or message delay and minimising suppression, while delivering messages in a sensible way to vehicle occupants. By 'sensible' is meant sequencing the time, location or presence of messages according to priorities and appropriate intervals for user attention.

Accordingly, the invention provides a method or device according to the claims.

BRIEF DESCRIPTION OF THE DRAWINGS

The invention is now described by way of example with reference to the following drawings.

DETAILED DESCRIPTION

A system or device that receives IVS messages will have location and direction of travel awareness. This may be through real time satellite navigation or wireless techniques, or it may in some instances be performed as a pre-journey download, for example if there is no connectivity during travel, even though that risks the loss of updates happening during travel.

Then there are at least two states to consider, one in which a route or destination is known, ("KWN") and another in which there is no known route or destination ("UNK"), but still having location tracking. As above, another possible state is where a route is known and the conflicts are determined before a journey commences.

A vehicle occupant will have a different experience depending on whether they are travelling in the KWN or UNK state. The same user may use both modes at different times, maybe not bothering with setting destinations when on a familiar route.

When travelling with a known destination the system according to a preferred version of the invention will monitor and manage for clashes between IVS messages (IVS-IVS clash), which includes clashes between 'official' signage such as from traffic management authorities and 'commercial' signage, and also for clashes between IVS and navigation "NAV" messages. When travelling with the destination unknown the system only needs to manage the IVS-IVS clashes and that will be described later.

The operation of an embodiment of the invention will first be described for a simple case where there is an IVS message for a vehicle travelling under navigational control with a known route or destination, the vehicle occupant, or one of the other occupants, having shared their destination with a navigation system or application that will provide guidance to the driver.

The usual way for a navigation system to operate is for route guidance to frequently update the suggested route based on a series of algorithms that seek to optimize for the vehicle occupant's travel or arrival time, or other preferences such as type of road (including no toll roads) and also taking into account other types of information that may be available such as traffic queues and sometimes offering update choices to the user. Navigation applications usually, at various times and in specific locations, suggest to the vehicle occupants what type of driving action should be taken, for example "turn left in 50 metres". Other navigation information may also be provided to the vehicle occupants, such as how long they will continue on a road, for example "continue on M1 for 20 miles".

Figure 1:
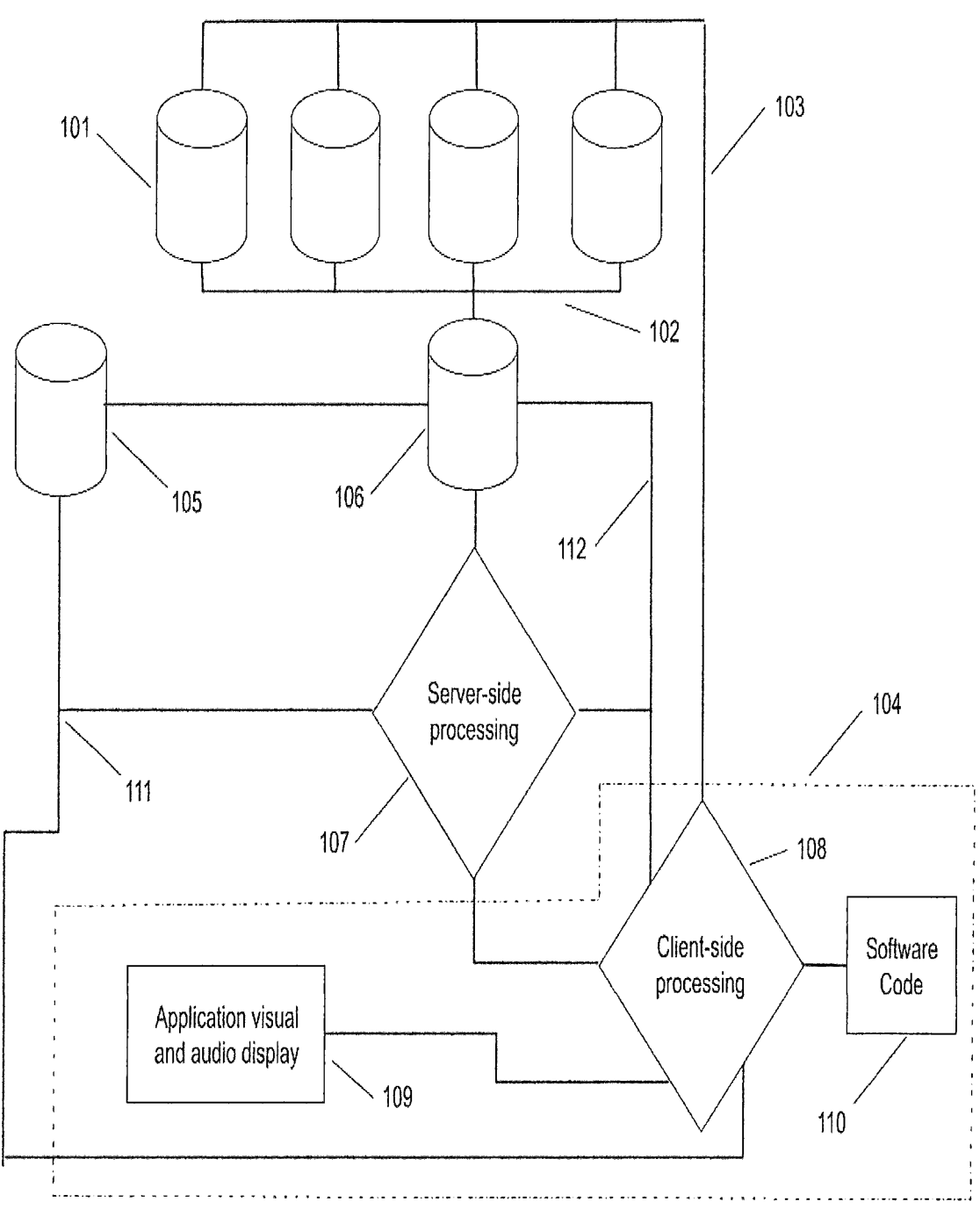
FIG. 1 is a schematic representation of a system with an application for delivering IVS message adjustment in accordance with an embodiment of the invention.

The message management of the invention is adapted to work as part of and/or connect to navigation and IVS systems, a first embodiment of which is shown schematically in FIG. 1.

In FIG. 1 a series of external databases where IVS data is stored is represented by boxes 101. These may be from providers such as Highways England or commercial providers and connect via an application interface 102 to a main database 106. Main database 106 may be part of the message management system or it may in future be a database provided by or shared with others, for example IVS providers, mapping providers or other commercial organisations. Main database 106 exchanges information with the server-side processing unit 107 that performs operations for message management and which communicates with client side processing unit 108 which is located in the application in or carried by the vehicle, represented by box 104. Processing unit 108 may perform a range of operations or share operations with server-side processing unit 107, but in general it will deal with inputs from the user such as the choice of data, for example language preference, geographical choices or type of vehicle, whether a caravan is being towed or whether HGV information wanted.

Box 110 represents the software that is loaded on the application in the car, mobile phone or other device and box 109 represents the visual and/or audio communications in the car or carried by a mobile phone or other device. Both the client side unit 108 and server side processor are connected via connections 111 to the application or 'internal' database 105 in which application and user specific data can be stored.

A second set of connections 112 may be used for in-flight algorithm updates and processing rule changes. It may not be necessary to have independent lines for this and the detail and arrangement of the connections and units may vary, or be combined, in particular depending on whether a dedicated or shared facility is in use.

IVS messages may be integrated into navigation systems utilising the present invention. The IVS messages will generally have a separate method of storage, shown in FIG. 1 as external databases 101, and separate methods as to how they will be triggered to appear in-vehicle, such as via the display 109, which may be either a stand-alone device or part of a navigation or information system. Data for IVS is collected from government and other agencies and is available in formats such as DATEX, XML or JSON.

To understand how an embodiment of the invention works it is useful to consider the way in which IVS providers generally provide spatial information regarding the location for the signage. Commonly this is in a 'Point and Radius' format or a 'Desired Crossing Point' format. These are shown respectively in FIGS. 2 and 3.

Figure 2:
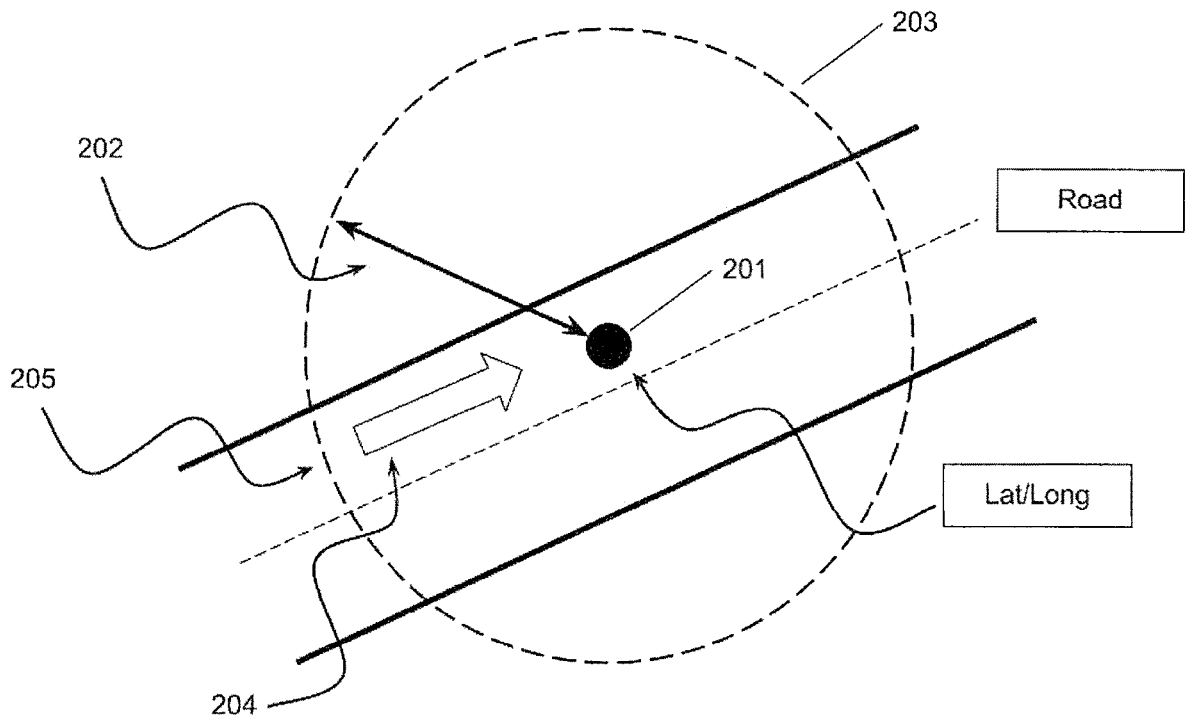
FIG. 2 is a diagram showing the relationship of a GPS Trigger point and an IVS 'point and radius' coordinate presentation.

Referring to FIG. 2, each single IVS point 201 will have a stored spatial location, for example geographical coordinates latitude, longitude and potentially altitude, as well as a trigger distance or radius 202, defining a trigger perimeter 203, and a direction of travel 204 from which the signage should be 'viewed'. As a result, there will be a trigger point 205 when the direction of travel intersects the trigger perimeter. That intersection determines when the IVS message will be delivered in a physically perceptible way, for example one or more of visually, such as on a screen, or audibly, or vibrationally.

Figure 3:
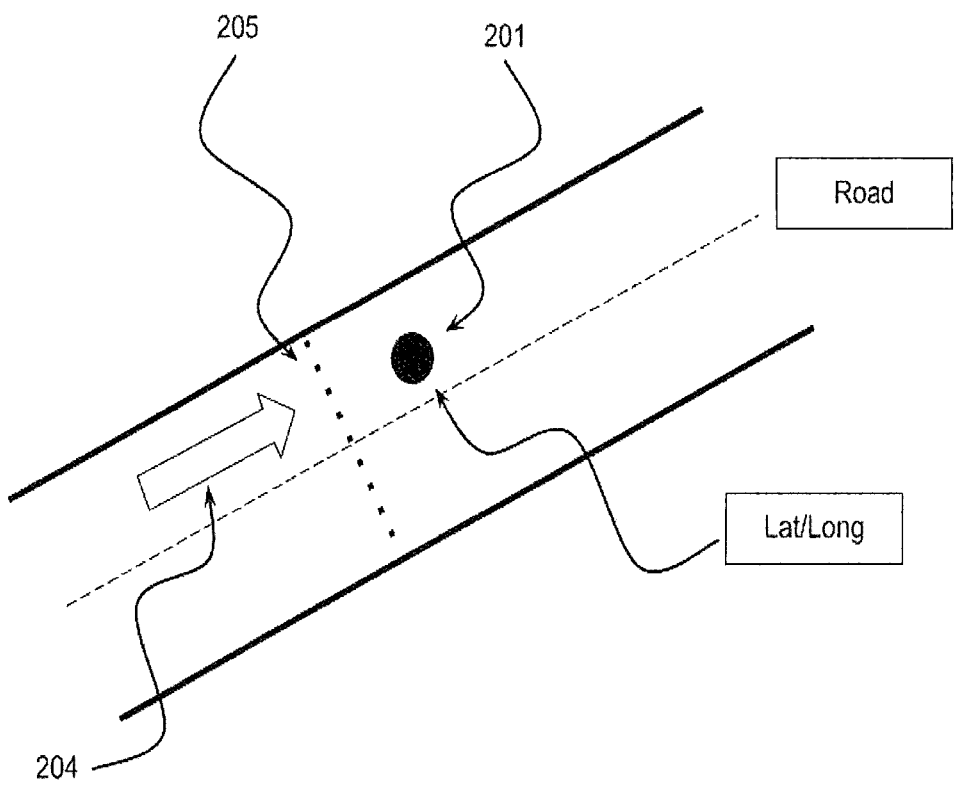
FIG. 3 is a diagram showing a 'road crossing point' coordinate presentation.

FIG. 3 shows the road crossing point format which is a simple intersection of a start line and direction of travel.

Potentially IVS information may come from a variety of providers using either format, or indeed alternatives.

Figure 4:
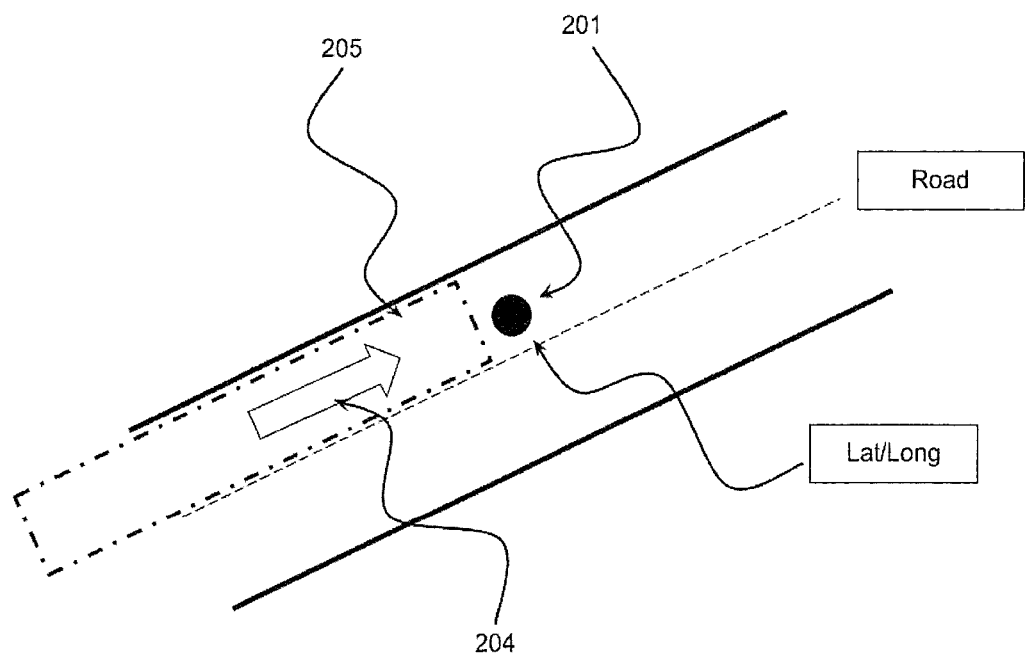
FIG. 4 is a diagram of a zone or polygon referencing system as preferably used in accordance with the invention.

In the preferred form of the invention the focus is not on the IVS point, i.e., the spatial 'position' of the sign, but on the (GPS) trigger point or the moment when the message is delivered to the driver. It would be possible to work from sign positions and the spatial location plus other data such as the travel vector (direction of travel and speed or minimum speed presumptions) define the trigger points as already explained in connection with FIGS. 2 and 3. Concentrating on where the trigger point is likely to be rather than on sign location makes it easier for a highway manager to determine where points are triggered without needing to consider speed and radius, making it simpler to place IVS triggers at lower risk points in a road—for example where there are fewer distractions, or a straight part of the road. There may of course be circumstances where some consideration also has to be given to the location of a hazard. The preferred embodiment of the invention uses a location 'zone' or region such as the polygonal zone shown in FIG. 4 for determining whether an IVS should be presented or modified, as will be explained below. FIG. 4 shows a rectangular polygon zone 4 but it may be circular or shaped otherwise and be among commercially available cell mapping formats or tiling. It may be possible to use a combination of zones or tiles as an enlarged zone or region, depending on the granularity required.

As previously explained, with the potential for several messaging systems operating, a user wishing to receive clear IVS may instead become bombarded with multiple messages resulting in confusion, over-speaking, delayed, partial or missing messages, distraction or even system error. An IVS may clash with another IVS (IVS-IVS clash) from the same or a separate source, which can happen in either a destination unknown or destination known mode. In the instance of destination known mode, there is also potential for a temporal conflict or clash between a navigation announcement (both visual and/or audio, "NAV") and an IVS announcement (visual and/or audio, "IVS") that occurs with a time or spatial overlap, referenced as a NAV-IVS clash. How these clashes or conflicts are managed is now described below.

Figure 5:
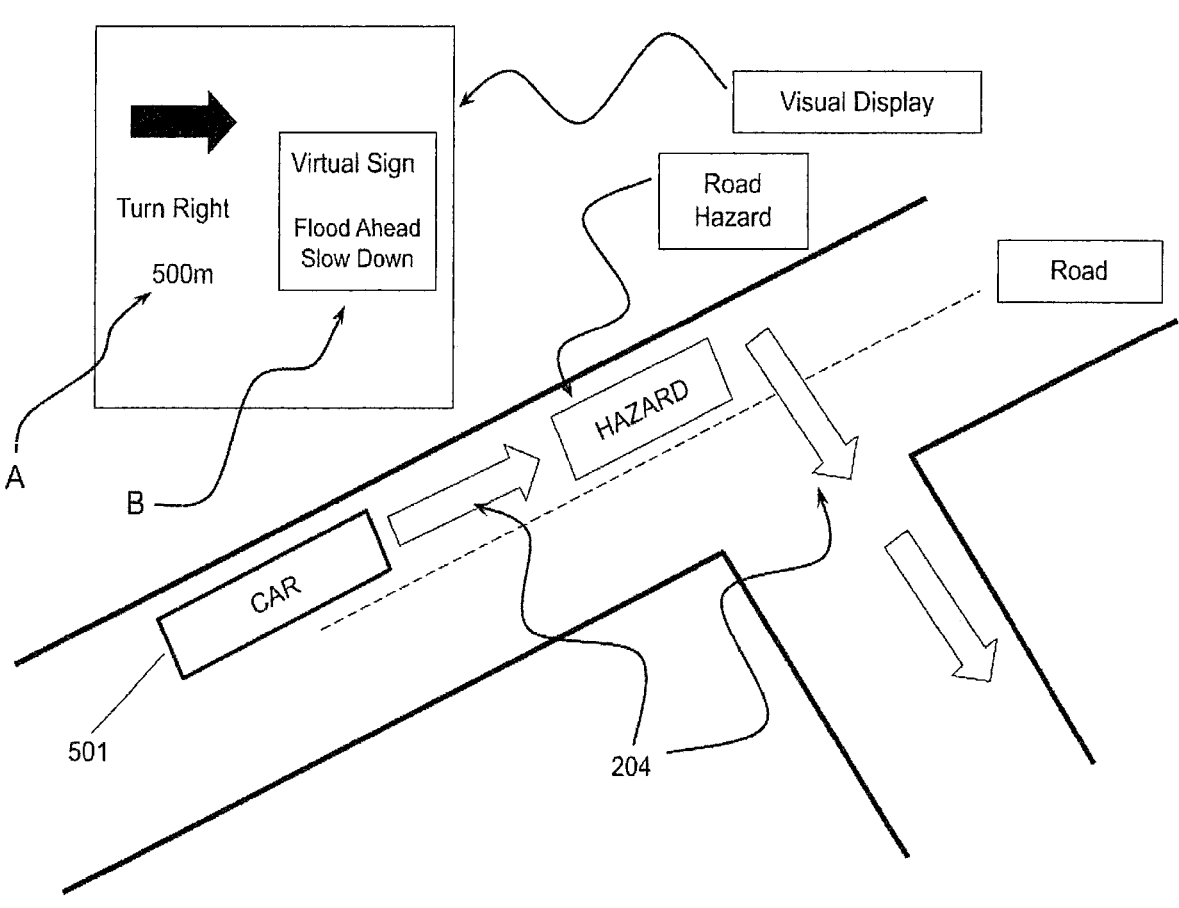
FIG. 5 is a diagrammatic representation of an IVS message arriving just before a turning.

A NAV-IVS conflict is shown in FIG. 5 where a car 501 is approaching a junction and receives two competing signs or messages, one (A) to 'turn right in 100 metres' from NAV and another (B) from IVS for 'Flood ahead, slow down'. In this example the flood warning is important as the driver must be alert for danger, but there may be various right turns so the information about when to turn has to be given unambiguously. The prioritization here will shift the IVS flood warning's trigger point so that it is given earlier, for example by a distance that corresponds to around 5 seconds, and the NAV direction follows in its original place.

Figure 6:
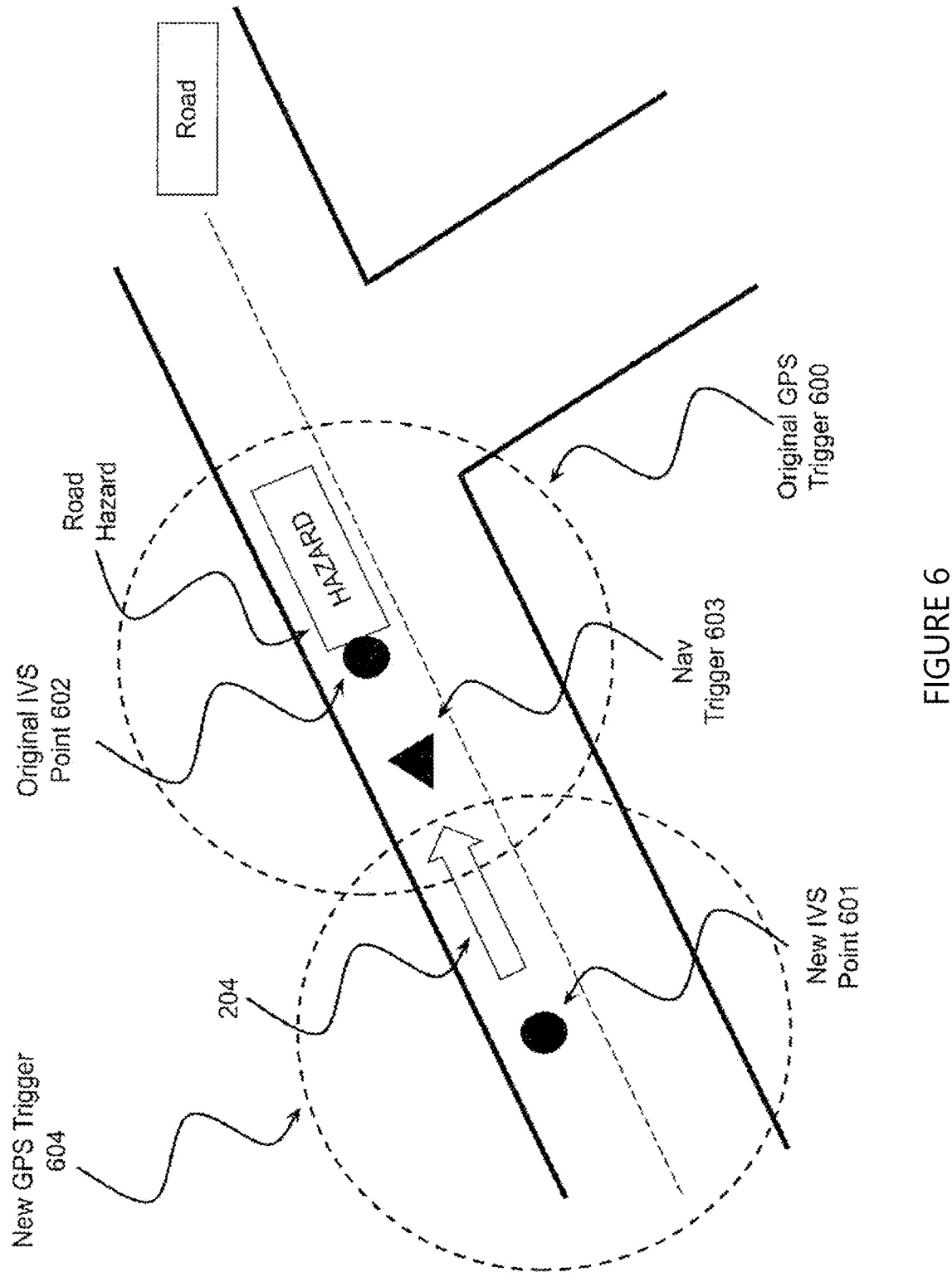
FIG. 6 is a diagram of shifted IVS points

A diagrammatic representation of this shift is shown in FIG. 6 where the new IVS spatial point 601 has been moved from its original spatial position 602, now coming before rather than after the NAV trigger 603; the new trigger point determined by the intersection of the direction of travel and the trigger zone 604 consequently occurs correspondingly earlier than that determined by the original trigger zone 600.

Variation in the movement shown in FIG. 6 may be possible. For example, it would be possible to alter only the relation between the sign and the trigger point such that only the latter moves, since that is the key for determining when the physically perceptible indication is delivered to the occupant. In other words, the alteration to the data redefines the delivery time, i.e. the trigger point, which could for example be through spatial/location references of the IVS point and/or through moving a vector associated with the IVS point, or through moving a stored location of the trigger point.

NAV-IVS clash is complex because the navigation route will be different for all drivers depending on the route they are travelling and the IVS available to them at particular times, noting that IVS may change throughout the day and navigation routing will suggest different routes based on many factors, including current traffic. In the preferred embodiment of the invention if there is a NAV-IVS clash, the usual general rule is for the navigation announcement to take original time/location priority, as a vehicle driver will need to know what road they need to take, and the IVS message is moved to occur at a different, usually earlier, position in the journey.

Adjusting the trigger point for the IVS, so that there is a suitable time interval between navigation announcements and IVS announcements is not a straightforward matter and the preferred form of the invention utilizes two stages.

First, as the route is known, the application will forward forecast which navigation announcements will be made by the navigational components and which IVS will be triggered. This forward forecast will be made at regular intervals within the system, so that updated IVS and updated routing are assessed yielding a forecast that is, for example, a minute ahead of the physical journey. With this forward forecast, the system will assess if there is overlap between navigation messages and IVS messages to infer if there is a NAV-IVS clash. For clarity, a NAV-IVS clash will usually be deemed to occur if there is an overlap or if the messages do not have a suitable time interval between them at a standard or presumed speed. The time interval will be adjustable dependent on factors, including weather, road conditions and the presumed speed, for example if the alerts would happen within 5 seconds of one another. User inputs may also be possible if longer separation is desired.

When a NAV-IVS conflict is detected, then as a second stage an adjustment algorithm will run to provide new IVS trigger points. In most cases, this will be earlier in the planned route (as described above in connection with FIG. 6) as this will be for a known destination mode where the vehicle path is known. The new IVS trigger point, which is likely to be earlier in the planned path, will then need to be stored with potentially different trigger actions, including the radius and direction of travel or the region defined by the polygonal area. The adjustment algorithm will need to consider multiple new variables, such as alternative NAV-IVS clashes that could be generated by the shift to create a new set of IVS trigger points for the upcoming vehicle path.

The system processing for this can occur either within the client application (104 FIG. 1) and/or the server-side application (107 FIG. 1).

For the UNK case, there is no navigation-based set of messages to consider. Nevertheless, as indicated in the KNW case, there may be clashes between multiple IVSs. There may also be conflict, handled in analogous manner, between an 'official' or traffic agency IVS and other messages which may be advertisements or other commercial messages.

IVS clashes will occur for various reasons. They may include but not be limited to excessive creation of IVS by one particular provider, user preferences triggering duplicate IVS, for example two languages of the same IVS, or IVS and in-vehicle messages from two different sources. An identified potential set of examples are IVS with road alerts ("Danger—Queue Ahead") plus GLOSA (Green Light Optimized Speed Advisory) traffic light alerts and wrong-way driver alerts.

Eventually there might be contemporaneous systems of HGV alerts for lorries, Highways England, Department for Transport, sports stadium or other event information, Transport for London, advertising, in-car tour guides and multiple languages.

IVS-IVS clash is significantly more complex to alleviate. In the preferred embodiment, a priority ranking of IVS is established, and first it removes IVS duplicates, such as multiple languages. Then if there is still a clash an adjustment algorithm is be run across IVS so that they are suitably spaced for different sets of users. This adjusts the way that IVS are stored, moving away from a spatial storage with trigger points (as shown and described with respect to FIG. 2 or FIG. 3) to a zone-based system shown in FIG. 4. If 2

IVS are within the same zone or group of zones (region), the adjustment algorithm will first again determine if they are duplicates and remove one if that is the case. Then, if there is still an IVS-IVS clash the adjustment algorithm will look to move the lower priority IVS to an adjacent zone or region and transfer across the trigger information to the new zone/region. If the adjacent zone/region has an IVS, the algorithm will repeat by considering whether it is a duplicate and then trying to move the IVS to an adjacent zone/region. If no available adjacent zone/region is available, the lower priority IVS will be removed. It may also be possible for a user to input preferences relating to the frequency of messages When an IVS is removed because there is no available zone, a notification may be generated for the author of the removed IVS, which is important feedback regarding message density and potentially changing the signage.

UNK type processing to remove IVS-IVS clashes, as described above, may also occur during KNW processing to remove any IVS-IVS clashes before navigation routing is applied, and then further NAV-IVS clashes may appear and require further modifications or removals.

Finally, there may be scenarios where high (location) priority IVS are created, and these can be given equal or higher priority than navigation messages. In this case, there is a necessity to move the trigger point of the navigation message. To achieve this, as this will be in a KNW situation, the projected path will suggest to the adjustment algorithm to move the navigation message to remove the NAV-IVS clash. The new navigation trigger point will impact the message's context to the vehicle occupant and will need to undergo an adjustment in the routing algorithm, for example changing from "turn left in 100 m" to "turn left in 200 m".

The invention has been described in the context of road transportation but may be used in other forms of surface transportation, maintenance or construction.

The invention claimed is:

1. A computerized method of controlling the physical indications of an in-vehicle message and at least one other message, wherein respective data defining each message is associated with data for causing a physically perceptible indication of said each message, the method comprising:

detecting a potential temporal conflict of occurrence between the in-vehicle message and said other message; and shifting in time the occurrence of at least one of the indications relative to the other of the said indications to remove the temporal conflict;

the method further including:

using, for causing said at least one of the indications, a trigger point at an intersection of a direction of travel of a vehicle and a perimeter of a trigger region extending spatially from a defined location for the message of which the respective indication is shifted; and shifting said trigger point to cause said shifting in time of the occurrence of said at least one of the indications.

2. The method of claim 1 in which the messages are allotted different priorities and the method comprises deciding between priorities and altering an occurrence of the indication of a message having a losing priority.

3. The method of claim 1 wherein each message defines a sign and each message is accompanied by data defining a respective zone, further comprising determining conflict when zones overlap.

4. The method of claim 3 in which each zone comprises one or more cells in a mapping system.

5. The method of claim 1 further comprising suppressing duplicate or low priority messages.

6. The method of claim 1 wherein at least one of said messages defines a respective traffic sign.

7. A computerized method of controlling the physical indications of a first message defining an in-vehicle sign and a second message, wherein respective data defining each message is associated with data for causing a physically perceptible indication of said each message, the method comprising:

detecting a potential temporal conflict of occurrence between said first and second messages; and shifting in time the occurrence of the indication of said first message relative to the indication of said second message to remove the temporal conflict, the method further including:

using, for causing the indication of said first message, a trigger point at an intersection of a direction of travel of a vehicle and a perimeter of a trigger region extending spatially from a defined location for said in-vehicle sign; and shifting said trigger point to cause said shifting in time of the occurrence of the indication of said first message, wherein the shifting of the trigger point comprises at least one of shifting said defined location and altering a relationship between said defined location and said trigger point.

8. The method of claim 1 in which the shifting of the trigger point comprises altering a relationship between said trigger point and said defined location.

9. A computerized system for controlling the physical indications of an in-vehicle message and at least one other message, wherein the data defining each message is associated with data for causing a physically perceptible indication of each message, the system comprising:

a processor that is responsive to a potential temporal conflict of occurrence between the in-vehicle message and said other message to shift in time the occurrence at least one of the indications relative to the other of the indications to remove the temporal conflict, the processor being responsive, for causing said at least one of the indications, to a trigger point at the intersection of the direction of travel of a vehicle and a perimeter of a trigger region extending spatially from a defined location for the message of which the respective indication is shifted, and disposed to shift said trigger point to cause the shifting in time of the occurrence of said at least one of the indications.

10. The system of claim 9, further comprising a receiving device controllable by said processor to exhibit said physical indications.

* * * * *